United States Patent [19]

Vadnais et al.

[11] Patent Number: 5,267,107
[45] Date of Patent: Nov. 30, 1993

[54] LAMINATED MAGNETIC TRANSDUCER

[75] Inventors: Timothy W. Vadnais, Victoria; Judy M. Ekern, Edina, both of Minn.

[73] Assignee: Seagate Technology, Inc., Scotts Valley, Calif.

[21] Appl. No.: 722,919

[22] Filed: Jun. 28, 1991

[51] Int. Cl.⁵ .......................... G11B 5/60; G11B 5/147
[52] U.S. Cl. ..................................... 360/103; 360/126
[58] Field of Search ............................ 360/103, 126

[56] References Cited

U.S. PATENT DOCUMENTS

| | | | |
|---|---|---|---|
| 4,369,477 | 1/1983 | Hanaoka | 360/126 |
| 4,851,942 | 7/1989 | Kumasaka | 360/103 |
| 4,854,035 | 8/1989 | Gukkenberger et al. | 29/603 |
| 4,890,379 | 1/1990 | Yohda et al. | 29/603 |
| 4,894,742 | 1/1990 | Saito et al. | 360/126 |
| 4,899,241 | 2/1990 | Miyakawa et al. | 360/125 |
| 4,947,542 | 8/1990 | Satomi et al. | 29/603 |
| 5,134,534 | 7/1992 | Sasaki | 360/126 |

Primary Examiner—A. J. Heinz
Attorney, Agent, or Firm—Kinney & Lange

[57] ABSTRACT

A magnetic transducer includes a laminate forming an I-core having a layer of magnetic material deposited between first and second non-magnetic substrates. The layer of magnetic material is generally perpendicular to and extends to a first surface of the I-core. A C-core member comprises a unitary magnetic body having a second surface confronting the first surface. A non-magnetic gap is between the first and second surfaces. An electrical coil or winding is wrapped around at least a portion of the laminate. In the preferred embodiment, lands are formed of the C-core to form a slider for the transducer.

19 Claims, 4 Drawing Sheets

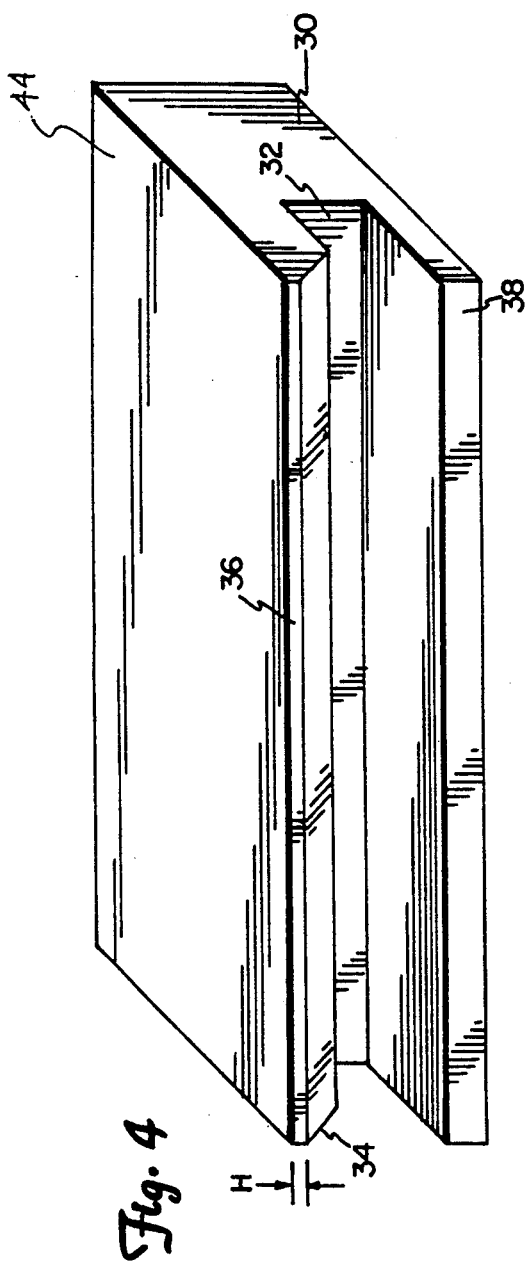
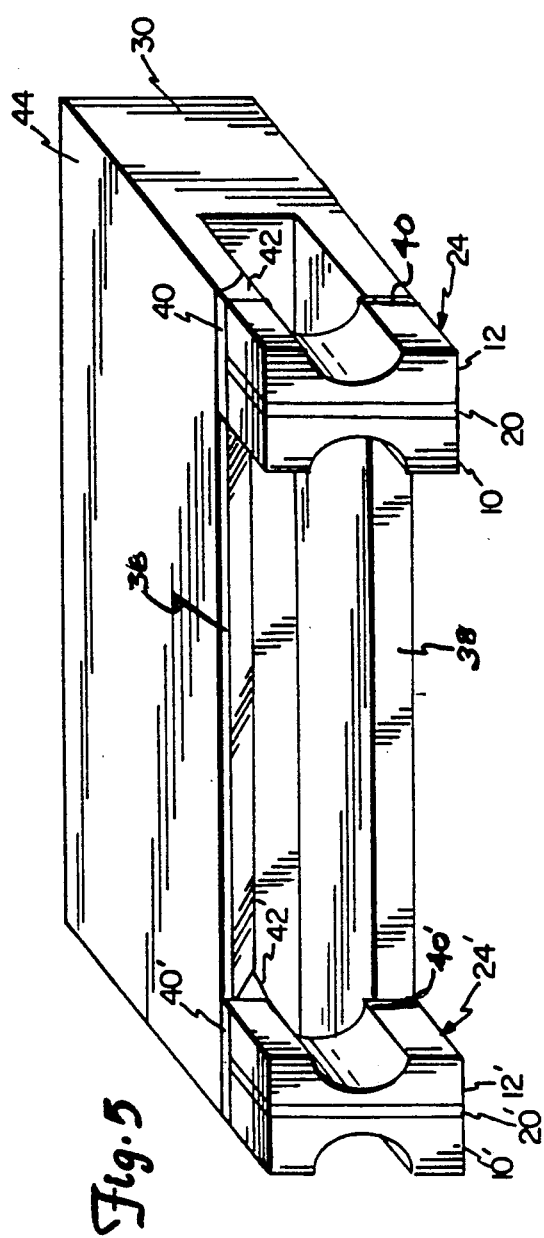

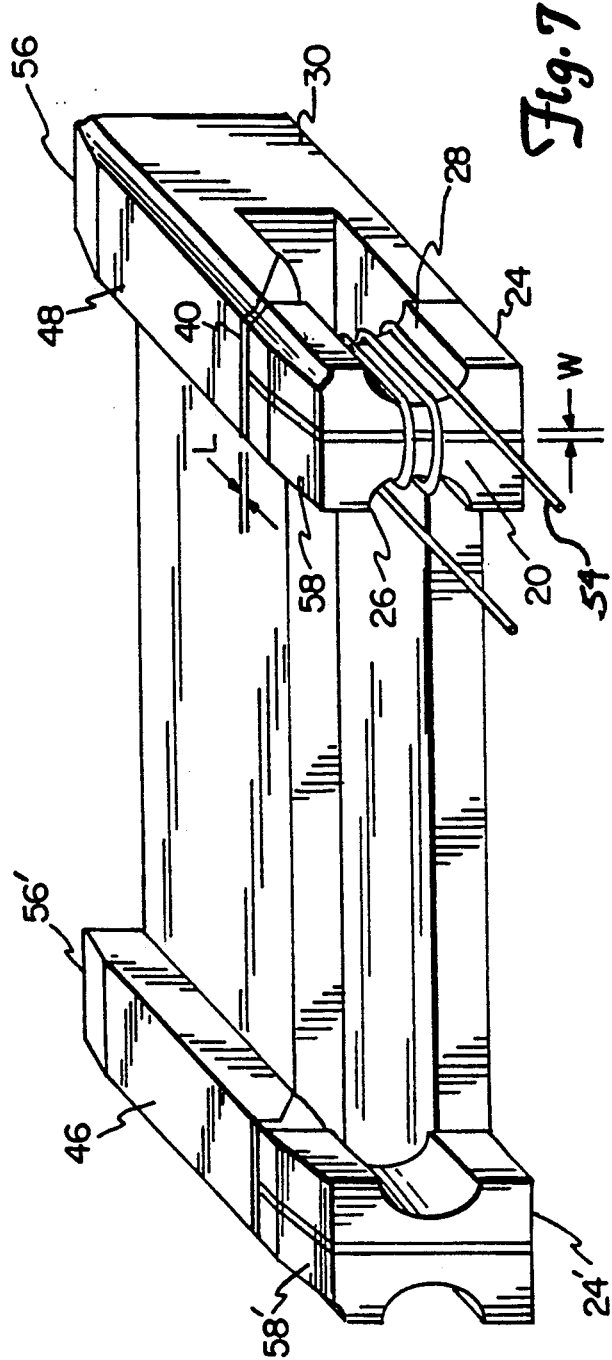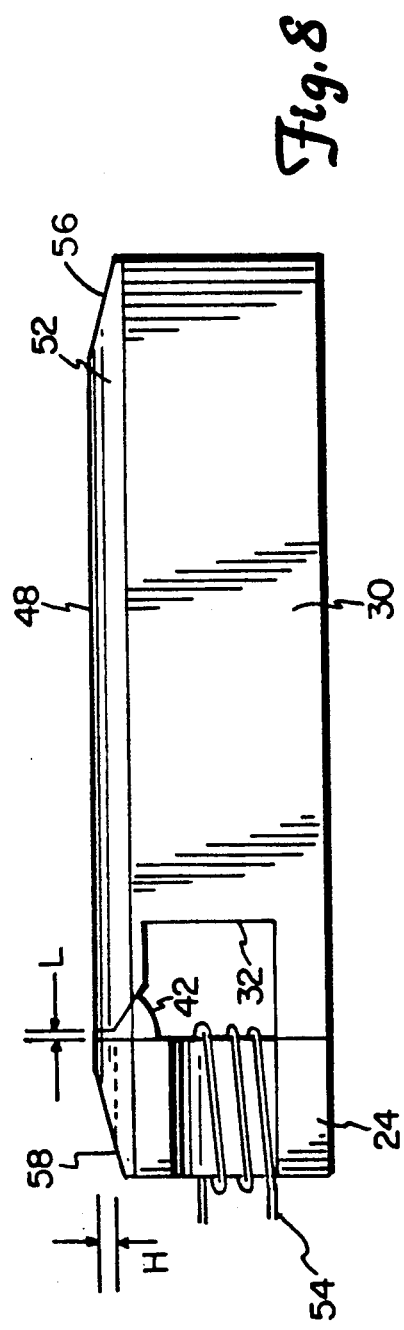
Fig. 7
Fig. 8

LAMINATED MAGNETIC TRANSDUCER

BACKGROUND OF THE INVENTION

This invention relates to magnetic transducers, and particularly to laminated magnetic heads for use with rotating magnetic media.

Magnetic transducers such as magnetic heads for computer disc drives comprise a magnetic material and a winding arranged to induce magnetic flux into a magnetic media adjacent a gap in the transducer (write function) and/or to perceive magnetic flux from an adjacent magnetic media (read function). In a magnetic disc drive, for example, the transducer will typically comprise a C-core and a confronting I-core with a gap between the two cores. A non-magnetic material, such as glass, is usually disposed between the confronting surfaces of the cores, within the gap, to precisely control the magnetic characteristics of the transducer, as well as to provide structural integrity for the transducer.

Three dimensions are critical to the design of the transducer: the gap width, which is orthogonal to the length of the track on the media; the gap length, which is parallel to the track; and the gap or throat depth or height, which is normal to both the width and length. The gap width defines the width of the magnetic circuit of the transducer, and hence the width of the track to be recorded onto or perceived from the magnetic media. The gap or throat height, together with the gap width, defines the surface area of the confronting surfaces of the two halves of the magnetic core.

In the digital recording arts, these three gap dimensions are critical to the performance, and data storage density, of the storage apparatus. For example, a relatively large gap width will create large track widths on the magnetic media, thereby diminishing the total number of tracks available on a media of a given size. If the gap length is large, greater magnetic flux is required to perform a recording, thereby requiring strong write signals and increasing the risk of inducing noise onto adjacent tracks. If the gap height is large, a substantial portion of the magnetic flux path will be away from the gap surface and the adjacent media, thereby decreasing the amount of magnetic flux induced into the magnetic media. Consequently, it is desirable to have all three dimensions, gap width, gap length and gap height, be as small as possible, but not so small that data cannot be read or recorded in the media.

Gap heights are typically controlled by tapering an inside surface of the C-core and lapping or polishing the read/write surface of the completed transducer to a controlled thickness. The gap length, which is typically a function of the thickness of the non-magnetic media within the gap, is controlled by the thickness of that media. For example, by depositing glass to a desired thickness, the gap length may be accurately controlled. However, gap width is not so easily controlled.

Typically, gap width is adjusted by grinding or lapping the sides of the cores to a desired gap width. However, material removal to achieve both gap width and gap length is unsatisfactory for high precision transducers for high density recording and read back.

The present invention concerns a laminated magnetic head. Until recently, laminate magnetic heads were known only to the tape recording industry. An example of such a magnetic head is described in the Hanaoka U.S. Pat. No. 4,369,477 issued Jan. 18, 1983. There, the laminate material forms the two legs of a C-core with the magnetic circuit closed by the tape itself. Such magnetic transducers are not adaptable to the disc art because magnetic disc transducers require an I-core to form a gap.

More recently, laminated heads employing laminated C-cores confronting laminated I-cores have been developed for the video tape recording art. Examples of such heads may be found in Gukkenberger et. al. U.S. Pat. No. 4,854,035, Yohda et. al. U.S. Pat. No. 4,890,379, Saito et. al. U.S. Pat. No. 4,894,742, Miyakawa et. al. U.S. Pat. No. 4,899,241, and Satomi et. al. U.S. Pat. No. 4,947,542. However, each of these laminated heads required both a laminated C-core and a laminated I-core which were difficult to align for assembly. Consequently, the manufacturing and assembly procedures were expensive and yielded low yield rates of useable heads, and the resulting head characteristics were difficult to control.

SUMMARY OF THE INVENTION

The present invention is directed to a laminated magnetic head for a disc drive, and the like, wherein one of the cores, for example the I-core, is a laminate containing a layer of high saturation magnetic material deposited between non-magnetic substrates, the thickness of the magnetic layer defining the track width. The magnetic layer is arranged generally perpendicular to and extending to a face of the I-core. The C-core is a body of magnetic material having a face confronting the face of the I-core. The C-core is bonded to the I-core with non-magnetic glass to form the gap, the thickness of the glass defining the length of the magnetic gap. Since the mass of the C-core is large in comparison to the mass of the layer of high saturation magnetic material of the I-core, alignment difficulties are minimized without sacrificing the integrity of the head. Consequently, the head may be more easily manufactured with a higher yield rate and greater reliability. Gap height is defined by controlled tapers within the C opening and by lapping the recording surface to the desired gap height.

One feature of the present invention resides in the fact that the C-core may be formed into a slider for the read/write head by cutting or etching lands into the C-core surface. The surfaces of the land and transducer which confront the magnetic media may be lapped by a high precision machine to adjust the aerodynamic characteristics of the head to very close tolerances.

Another feature of the present invention resides in the fact that the thickness of the high saturation magnetic layer of the laminate can be accurately controlled by deposition techniques, thereby accurately controlling the gap width without machining.

Another feature of the present invention resides in the fact that the C-core and slider may be a ferrite selected for compatibility with the magnetic media, thereby reducing stiction. Further, since the slider is formed out of the C-core, problems associated with different coefficients of thermal expansion between the core and the slider are eliminated.

Another feature of the present invention resides in the fact that the high saturation magnetic material defining one pole of the core is so thin, as compared to the ferrite slider forming the second core, that specific magnetic heads employing the innovative concepts of the present invention can be easily designed by computer modeling. In this respect, the size of the ferrite core may be presumed to be infinitesimally large compared to the size of the high saturation magnetic layer of the laminate core, thereby rendering head designs easily adaptable for mathematical modeling.

BRIEF DESCRIPTION OF THE DRAWINGS

FIGS. 1-6 illustrate the process for manufacture of a magnetic transducer in accordance with the preferred embodiment of the present invention; and FIGS. 7 and 8 illustrate a completed magnetic transducer in accordance with the present invention, FIG. 8 being a side view of the transducer illustrated in FIG. 7.

DETAILED DESCRIPTION OF THE PREFERRED EMBODIMENTS

Figure 1:
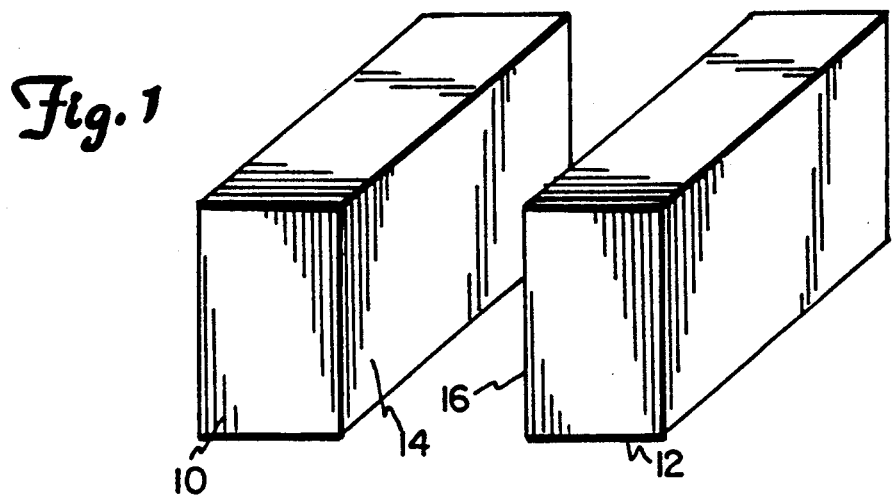
Figure 2:
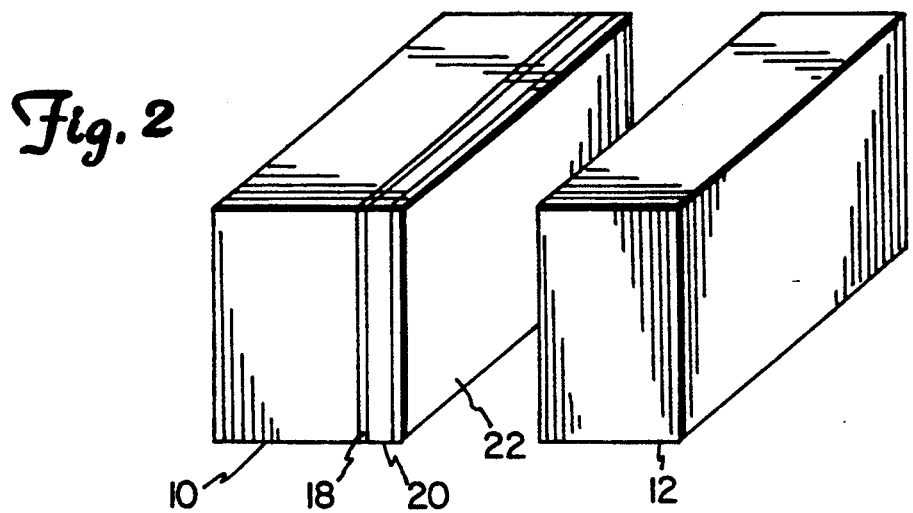

In FIG. 1, the confronting surfaces 14 and 16 of a pair of calcium titanate ($CaTiO_3$) substrates 10 and 12 are lapped to a roughness average of less than about 0.3 micro inch to a flatness of about 12.0 micro inches. As shown in FIG. 2, a layer of high temperature bonding glass 18 is sputter-deposited to a thickness of about 5 micro inches onto the lapped surface of one of the substrates, such as surface 14 of substrate 10. A layer 20 of Sendust (5% aluminum, 10% silicon and 85% ferrite) is sputter-deposited to a thickness of about 400 to 600 micro inches onto the exposed surface of glass layer 18, and a layer 22 of high temperature bonding glass is sputter-deposited to a thickness of about 5 micro inches onto the exposed surface of layer 20. The lapped surface of the other $CaTiO_3$ substrate, such as surface 16 of substrate 12, is then positioned against the exposed surface of glass layer 22 and the lamination is diffusion-bonded in a high temperature oven at about 700° C. It is preferred that a high temperature glass be used to bond the Sendust to the $CaTiO_3$ substrates to avoid delamination in subsequent process steps.

Figure 3:
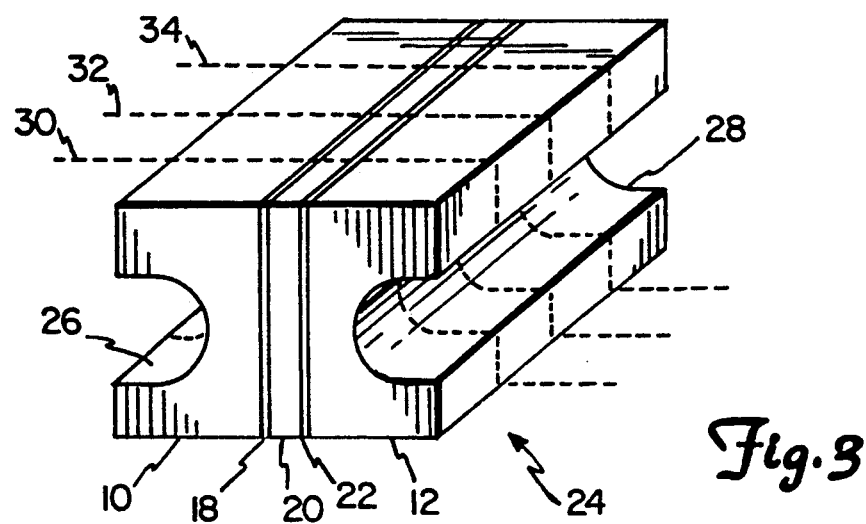

The completed laminate is shown as block 24 in FIG. 3. Grooves 26 and 28 are cut into the substrates 10 and 12 of block 24 on opposite sides of the Sendust laminate layer. As will be explained, grooves 26 and 28 will form a portion of the winding window for the winding of the ultimate transducer. Block 24 is sliced at lines 30, 32 and 34 to form individual laminate I-cores for the heads. The surfaces of the laminate I-cores formed by slicing or cutting at lines 30, 32 and 34 are lapped using an ABS process to 0.3 micro inch roughness average and a flatness of about 12 micro inches. As will be explained below, the completed thickness of the I-cores will be of the order of 0.15 inches, but it may be desirable to cut and lap the I-cores to a larger size for ease of assembly to the C-cores, and to cut the I-cores to size in situ before winding the coil thereon.

As illustrated in FIG. 4, the C-core is formed from an end of a ferrite block 30 by cutting a groove 32 in the end to form a portion of the winding window. Preferably, a flat chamfer surface 34 is cut between the surface 36 of block 20 and the groove 32 to define a straight line at the intersection between surface 36 and chamfer surface 34 parallel to surface 44. At least surface 36, and preferably also the parallel surface 38, are thereupon lapped to a roughness average of less than about 0.3 micro inch and a flatness of about 12 micro inches. At this point in the process, the height of surface 36 between surfaces 32 and 44 as shown by dimension H in FIG. 4 is a few micro inches greater than the gap thickness or throat height of the completed transducer.

As illustrated in FIG. 5, the I-core 24 is assembled to the C-core 30 so that the lapped surface 36 of the C-core confronts the lapped surface of the I-core carrying an edge of the magnetic layer 20. A layer 40 of non-magnetic gap material, such as glass, is sputter-deposited onto either the lapped surface of the I-core 24 (or a portion thereof) or onto the surface 36 of the C-core 30, and the glass is thereupon bonded to the other surface. The glass employed for layer 40 has a lower melting temperature than the glass employed to bond the laminate of the I-core together so that the I-core does not de-laminate during deposition of layer 40. Layer 40 is thus disposed between lapped surface 36 of the C-core and the confronting lapped surface of the I-core to thereby form the front magnetic gap of the head. Conveniently, a fillet 42 of low temperature glass is bonded between the C-core and I-core in the region of the chamfer 34 for structural integrity. Conveniently, the back gap, formed between the surface 38 of the C-core and the confronting lapped surface of the I-core, is also bonded with the layer 40 of glass. While the resulting back gap has the same thickness as the front gap, no discernable degradation of reluctance occurs due to the substantially larger surface area of the mutually confronting surfaces of the back gap as compared to the front gap. A fillet is not required at the back gap because of the relatively large bonding surface area.

Figure 6:
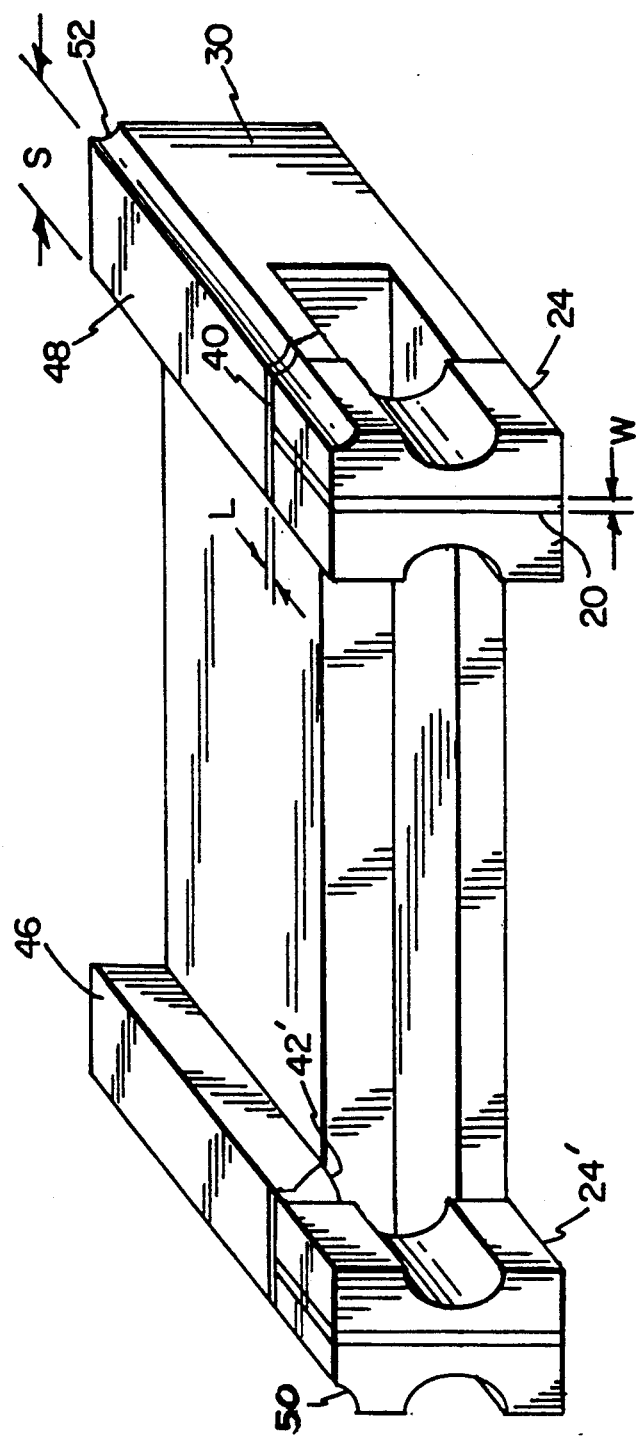

As illustrated in FIG. 6, the top surface 44 of the C-core portion of the head is cut to form lands having surfaces 46 and 48 for the eventual slider for the transducer. The surfaces 46 and 48, together with the coplanar surfaces of laminates 24 and 24' are lapped to define the throat height, H, between about 50 and 150 micro inches (depending on the particular design criteria, and to achieve a roughness average of less than 0.3 micro inches and a flatness of about 12 micro inches to form aerodynamic surfaces for the head. The throat height can be easily measured through microscope viewing through the glass at the side of the unit. The edges of lands 46 and 48 are then chamfered as at 50 and 52 to accurately control the width, S, of the lands for desired aerodynamic characteristics. For example, the lands may be accurately machined to a width of about 0.17 inch, plus or minus 50 micro inches.

If the I-cores were not cut to size earlier (for example, if left larger to facilitate handling during assembly), the exposed ends of the I-cores (exposed to what will become the trailing end of the transducer) will be cut to the desired length, such as 0.15 inches between the exposed end and the gap 40. In any event, the I-cores will be cut to size before applying the winding or coil 54 described below.

FIGS. 7 and 8 illustrate the completed transducer using the assembled C-core and I-core shown in FIG. 6. Coil or winding 54 is wrapped around the I-core through the window portions formed by grooves 26 and 28 in substrates 10 and 12 and the C groove in the C-core 30. Coil 54 forms, for example, the read/write winding for the head. Leading surfaces 56 and 56' are formed in the leading portions of lands 48 and 46, respectively, and trailing surfaces 58 and 58' are formed in the trailing portions of the respective lands, for aerodynamic response for the head.

As shown particularly in FIG. 7, the head portion associated with I-core 24' is not provided with a winding. This I-core is provided for symmetry purposes to maintain balance of the head and to eliminate aerodynamic imbalance as the head flies over the media surface.

As can be appreciated from an inspection of FIGS. 5 through 8, the gap width, W, of the completed magnetic head is determined by the thickness of the high saturation magnetic layer 20. The length, L, of the magnetic gap is determined by the thickness of the glass layer 40, and the height, H, of the gap is determined by the remaining height of surface 36 of the C-core. Hence, only the gap height is determined by machining (namely, the lapping of the surfaces 46 and 48 of the lands). Gap width and length are each determined by controlled deposition.

Likewise, the aerodynamic characteristics of the slider are controlled by lapping, without affecting the gap length or width. In particular, the surfaces 50 and 52 permit controlled definition of the aerodynamic characteristics of the slider and of the head.

Another feature of the invention resides in the fact that the C-core is formed of the same ferrite block as the slider for the head thereby permitting selection of a material compatible to, and having favorable tribology with, the magnetic media.

The present invention thus provides a simple magnetic transducer construction having small and tightly toleranced gap widths and lengths. Throat height is more easily controlled because the throat height may be lapped to size on the pad. Further, the throat height is directly measurable in situ. Since significant amounts of bonding glass are not located in the region of the read/write surface, there is little danger of corrosion or contamination or the formation of voids in the glass during lapping which could lead to failure of the transducer. The slider lands can be reproduced with greater consistency because the ferrite can be cut and lapped on machines having greater cutting and lapping precision. Thus, the transducer according to the present invention is a highly reliable transducer, accurately reproducible to a high degree of tolerance without significant misalignment.

Although the present invention has been described with reference to preferred embodiments, workers skilled in the art will recognize that changes may be made in form and detail without departing from the spirit and scope of the invention.

What is claimed is:

1. A magnetic transducer comprising:
   a laminate having first and second non-magnetic layer therebetween and a first surface, the magnetic layer having a thickness defined between the non-magnetic members and being oriented generally perpendicular to and extending to the first surface so that the first surface includes the thickness of the magnetic layer;
   a core member comprising a nonlaminate magnetic body having a second surface confronting said first surface wherein the second surface has a width greater than the thickness of the magnetic layer; and
   non-magnetic gap material positioned between said first and second surface to form a gap therebetween, the gap having a width defined by the thickness of a magnetic member and a length between the first and second surfaces.

2. A magnetic transducer according to claim 1 wherein said magnetic layer is bonded to said first and second members with glass.

3. A magnetic transducer according to claim 1 wherein said first and second non-magnetic members are constructed of calcium titanate.

4. A magnetic transducer according to claim 1 wherein said laminate is an I-core.

5. A magnetic transducer according to claim 4 further including grooves in said first and second nonmagnetic members arranged substantially normal to said first surface, and a coil wrapped around said I-core in said grooves.

6. A magnetic transducer according to claim 1 wherein said core member is a C-core forming a window at least partially receiving a coil.

7. A magnetic transducer according to claim 1 wherein said core member forms an aerodynamic slider.

8. A magnetic transducer according to claim 1 wherein said non-magnetic gap material is glass.

9. A magnetic transducer according to claim 1 wherein said laminate is an I-core and said core member is a C-core, and a coil wrapped around said I-core.

10. A magnetic transducer according to claim 9 wherein said first and second non-magnetic members have grooves arranged substantially normal to said first surface, said coil being wrapped around said I-core in said grooves.

11. A magnetic transducer according to claim 9 wherein said magnetic layer is bonded to said first and second members with glass.

12. A magnetic transducer according to claim 9 wherein said first and second non-magnetic members are constructed of calcium titanate.

13. A magnetic transducer according to claim 9 wherein said C-core includes lands forming an aerodynamic slider.

14. A magnetic transducer according to claim 9 wherein said non-magnetic gap material is glass.

15. A magnetic transducer comprising:
    a slider having a nonlaminate magnetic C-core region adjacent an end of the slider, the C-core having a first face;
    a laminated I-core bonded to the C-core and having first and second non-magnetic substrates and a magnetic layer therebetween, the magnetic layer having a thickness defined between the substrates, the I-core having a second face including a surface of the magnetic layer generally parallel to said first face wherein the first face is wider than the thickness of the magnetic layer, the magnetic layer being oriented generally perpendicular to and extending to the second face; and
    a non-magnetic material positioned between the first and second faces forming a gap having a width defined by the thickness of the magnetic layer and a length between the first and second faces, 16. A magnetic transducer according to claim 15 further including grooves in said first and second non-magnetic substrates arranged substantially normal to said second face, and a coil wrapped around said I-core in said grooves.

17. A magnetic transducer according to claim 15 wherein said magnetic layer is bonded to said first and second substrates with glass.

18. A magnetic transducer to claim 15 wherein said first and second non-magnetic substrates are constructed of calcium titanate.

19. A magnetic transducer according to claim 15 wherein said non-magnetic gap material is glass.

* * * * *

UNITED STATES PATENT AND TRADEMARK OFFICE
CERTIFICATE OF CORRECTION

PATENT NO. : 5,267,107
DATED : November 30, 1993
INVENTOR(S) : TIMOTHY W. VADNAIS, JUDY M. EKERN It is certified that error appears in the above-identified patent and that said Letters Patent is hereby corrected as shown below:

Col. 5, line 46, after "non-magnetic", insert --members and a magnetic--

Col. 6, line 54, delete "faces,", insert --faces.--

Signed and Sealed this

Twenty-sixth Day of April, 1994

Attest:

BRUCE LEHMAN

Attesting Officer

Commissioner of Patents and Trademarks